S. C. & R. F. ODEN.
CORN PLANTER.
APPLICATION FILED SEPT. 24, 1913.

1,089,071.

Patented Mar. 3, 1914.

Witnesses

Inventors
S. C. ODEN and
R. F. ODEN

By Watson E. Coleman
Attorney

COLUMBIA PLANOGRAPH CO., WASHINGTON, D. C.

UNITED STATES PATENT OFFICE.

SOPHA C. ODEN AND ROY F. ODEN, OF HAWARDEN, IOWA.

CORN-PLANTER.

1,089,071. Specification of Letters Patent. Patented Mar. 3, 1914.

Application filed September 24, 1913. Serial No. 791,574.

*To all whom it may concern:*

Be it known that we, SOPHA C. ODEN and ROY F. ODEN, citizens of the United States, residing at Hawarden, in the county of Sioux and State of Iowa, have invented certain new and useful Improvements in Corn-Planters, of which the following is a specification, reference being had to the accompanying drawings.

This invention relates to certain improvements in corn planters and has relation more particularly to a device of this general character known as a check row planter, and the object of the invention is to provide a device of this general character having novel and improved means whereby the dropping mechanism is under control of an endless chain adapted to be thrown into and out of operative position by an element which serves to create a suitable marking when the chain is thrown into inoperative position in order to indicate at what point the planting operation is to be renewed.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1:
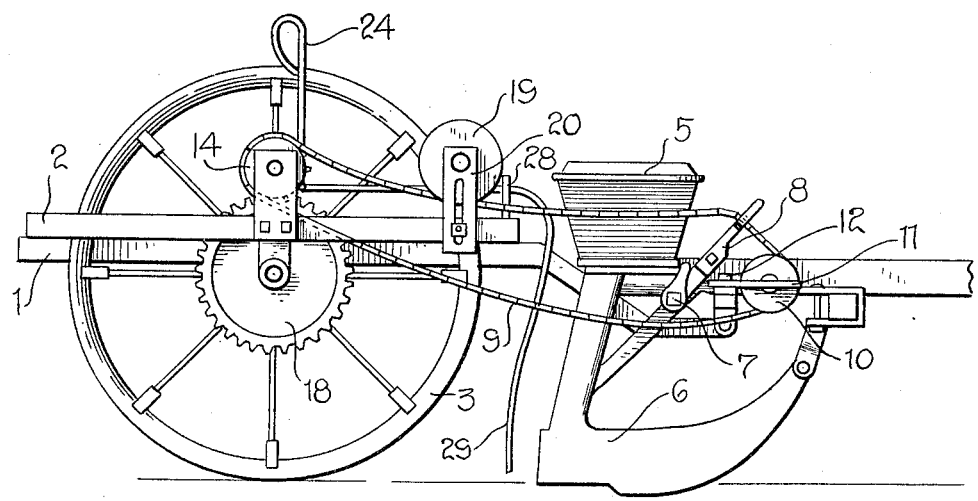
Figure 2:
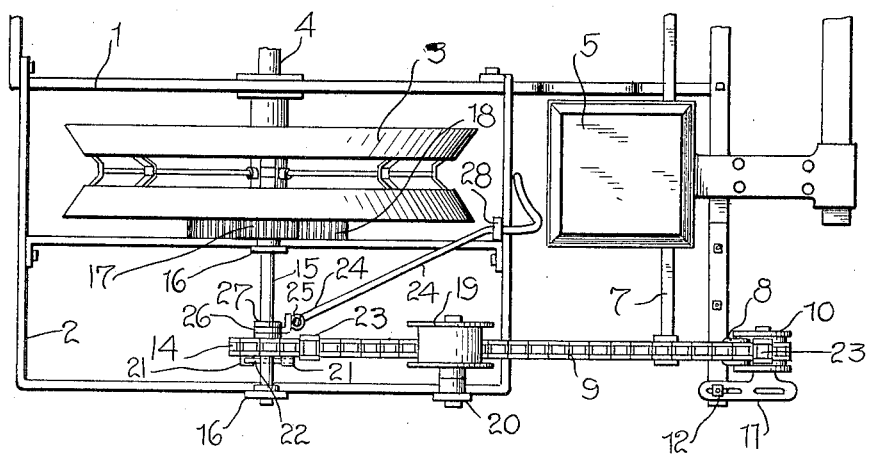
Figure 3:
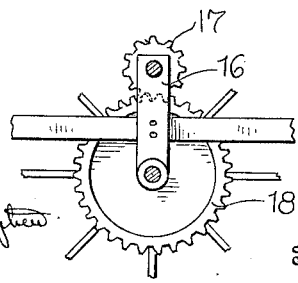

Figure 1 is a view in side elevation of a corn planter constructed in accordance with our invention; Fig. 2 is a fragmentary view in top plan of Fig. 1; and Fig. 3 is a fragmentary view partly in elevation and partly in section illustrating certain details of the invention, as herein disclosed.

As herein disclosed, 1 denotes a portion of the main frame or planter of any ordinary or preferred construction, while 2 denotes an auxiliary frame suitably secured to the main frame 1 and projecting a predetermined distance beyond one of the supporting traction wheels 3 mounted in the usual way upon the supporting axle 4.

5 denotes one of the boxes or hoppers in which the corn is adapted to be placed for planting and beneath which is provided the runner or furrow-opener 6.

7 denotes a shaft which extends across the forward portion of the main frame 1 and which is adapted to control the dropping mechanism (not shown) of the boxes or hoppers. One end portion of this shaft 7 is provided with a forked operating lever 8 rigidly secured thereto, between the tines of which the chain 9 is adapted to pass as it is operated. The claim 9 passes around a sprocket wheel 10 suitably mounted in a bracket 11 adjustably supported, as at 12, upon the forward portion of the frame 1 and around a sprocket 14 loosely mounted on a shaft 15 rotatably supported in the upstanding brackets 16 carried by the auxiliary frame 2 at the outer side of the traction wheel 3. The inner end portion of the shaft 15 is provided with a gear 17 adapted to mesh with a larger gear 18 fixedly secured to the traction wheel 3 and concentric with the axis thereof. While we have found this operative connection with the traction wheel to work with facility, we do not wish to be understood as limiting ourselves to this particular arrangement as it is thought to be obvious that other forms of connections may be employed with equal facility. The upper stretch of the chain 9 is engaged by the tensioning roller 19 rotatably supported in the vertically adjustable bracket 20 projecting upwardly from the outermost side of the auxiliary frame 2. The outer face of the sprocket 14 is provided with the projecting lugs 21 adapted to be brought into contact with the cross pin 22 projecting through the shaft 15 whereby it will be observed that such sprocket 14 may be caused to rotate with the shaft 15.

At predetermined points therein the chain 9 is provided with the widened links 23 which are adapted to engage the tines of the lever 8 and move the lever forwardly against the action of a spring (not shown) employed in devices of this general character for imparting return movement to the shaft 7 and cause the shaft 7 to be rocked and operate the dropping mechanisms in the boxes. It is preferred that the widened or enlarged links 23 be equidistantly spaced in order that the dropping mechanism will be operated as the chain 9 travels a predetermined distance and thus assure that the rows will be dropped in line with each other.

When it is desired for any reason to cause the dropping mechanism to become inoperative movement endwise of the shaft 15 is imparted to the sprocket 14 which causes the lugs 21 thereof to become disengaged from the cross pin 22 and, as herein shown, this movement of the sprocket wheel 14 is accomplished by the lever 24 which is directed through a suitable eye 25 in swiveled connection with a ring 26 in suitable engagement with the projected hub 27 extended inwardly of the shaft 15 whereby it will be readily observed that upon a rocking movement being imparted to the lever 24, the sprocket wheel 14 will be moved either to engage or disengage the lugs 21 from the cross pin 22. In order that the requisite rocking movement may be given to the lever 24, such lever is directed through an upstanding arm 28 suitably mounted on the auxiliary frame 2 and the inner end portion of such lever 24 is suitably directed so as to terminate in close proximity to the surface over which the planter is being drawn when the lever 24 is adjusted to bring the lugs 21 of the sprocket 14 into contact with the cross pin 22 and of such a length as to impinge or penetrate the surface when the lever 24 is adjusted to disengage the lugs 21 from the cross pin 22 so that when it is desired to resume the planting, the markings in the surface created by the contact of the end portion 29 will indicate the exact point at which such planting should be resumed, it being observed that the eye 25 serves as a fulcrum to permit the requisite rocking movement.

From the foregoing description, it is thought to be obvious that a corn planter constructed in accordance with our invention is of an extremely simple and comparatively inexpensive nature and is particularly well adapted for use by reason of the facility and convenience with which it may be adjusted into operative or inoperative position and by reason of the manner in which proper indication is given as to the point at which to resume the planting after the device has been rendered inoperative and it will also be obvious that our invention is susceptible of some change and modification without material departure from the principles and spirit thereof, and for this reason we do not wish to be understood as limiting ourselves to the precise arrangement and formation of the several parts herein shown in carrying out our invention in practice.

We claim:

1. In a device of the character described, the combination with a feeding mechanism, means for driving such mechanism including a clutch, means for disengaging the clutch whereby the feeding mechanism becomes inoperative, and means operable with the clutch operating means for marking the ground simultaneously with the disengagement of the clutch.

2. In a device of the character described, the combination with a feeding mechanism, a driving means for such mechanism including a clutch, a lever for adjusting the clutch in operative or inoperative relation whereby the operation of the feeding mechanism is controlled, and means operatively connected with the lever for marking the ground when the lever is operated to adjust the clutch into inoperative position.

3. In a device of the character described, the combination with a feeding mechanism, a driving means for such mechanism including a clutch, a lever for adjusting the clutch in operative or inoperative relation whereby the operation of the feeding mechanism is controlled, such lever being provided with an extension adapted to impinge the ground and create a marking when the lever is operated to adjust the clutch into inoperative position.

In testimony whereof we hereunto affix our signatures in the presence of two witnesses.

SOPHA C. ODEN.
ROY F. ODEN.

Witnesses:
J. A. SWENSON,
R. O. JOHNSON.

Copies of this patent may be obtained for five cents each, by addressing the " Commissioner of Patents, Washington, D. C."